United States Patent [19]

Yoshida et al.

[11] Patent Number: 4,845,173

[45] Date of Patent: Jul. 4, 1989

[54] PROCESS FOR PRODUCING THERMOPLASTIC ELASTOMERS

[75] Inventors: Nobuyuki Yoshida; Akio Imai; Tomoaki Seki, all of Chiba, Japan

[73] Assignee: Sumitomo Chemical Company, Osaka, Japan

[21] Appl. No.: 830,041

[22] Filed: Feb. 18, 1986

[30] Foreign Application Priority Data

Feb. 18, 1985 [JP] Japan .................................. 60-30007

[51] Int. Cl.$^4$ ............................................. C08F 297/04
[52] U.S. Cl. ..................... 525/272; 525/250; 525/256; 525/258; 525/271
[58] Field of Search ............... 525/250, 271, 256, 258, 525/314, 272

[56] References Cited

U.S. PATENT DOCUMENTS

| | | | |
|---|---|---|---|
| 3,778,490 | 12/1973 | Hsieh | 525/314 |
| 3,825,623 | 7/1974 | Laflair | 525/267 |
| 4,054,616 | 10/1977 | Miki et al. | 525/314 |
| 4,220,738 | 9/1980 | Miki et al. | 525/256 |
| 4,335,221 | 6/1982 | Gerberding | 525/250 |
| 4,346,193 | 8/1982 | Warfel | 525/250 |
| 4,377,665 | 3/1983 | Shiraki et al. | 525/250 |
| 4,603,155 | 7/1986 | Muramori et al. | 525/271 |

FOREIGN PATENT DOCUMENTS 1014999 12/1965 United Kingdom ................ 525/271

*Primary Examiner*—Wilbert J. Briggs, Sr.
*Attorney, Agent, or Firm*—Sughrue, Mion, Zinn, Macpeak & Seas

[57] ABSTRACT

A process for producing a thermoplastic elastomer comprising a block copolymer of the A-B-A' type, wherein A is a monovinyl aromatic hydrocarbon polymer block, B is a conjugated diolefin polymer block, and A' is either the same as A or a polymer block derived from a dialkenyl aromatic hydrocarbon or a dihalogenated hydrocarbon, which process comprises polymerizing a monovinyl aromatic hydrocarbon in a polymerization medium in the presence of an organomonolithium compound as a polymerization initiator, adding a conjugated diolefin to perform block copolymerization, and further adding a monovinyl aromatic hydrocarbon to perform polymerization or in the alternative, adding a dialkenyl aromatic hydrocarbon or a dihalogenated hydrocarbon to perform coupling, wherein the monomer components are used in such amounts that the weight ratio of (A+A') to B ranges from 10/90 to 65/35, and a chained aliphatic hydrocarbon solvent containing from 0.0001 to 0.1 wt % of a Lewis basic compound is used as the polymerization medium, is disclosed. According to the process of the invention, the desired thermoplastic elastomer having good physical properties is readily obtainable with high reproducibility.

8 Claims, No Drawings

PROCESS FOR PRODUCING THERMOPLASTIC ELASTOMERS

FIELD OF THE INVENTION

The present invention relates to an improved process for producing a thermoplastic elastomer.

BACKGROUND OF THE INVENTION

Block copolymers of the A-B-A type, wherein A is typically a monovinyl aromatic hydrocarbon polymer block and B is a conjugated diolefin polymer block, are well known thermoplastic elastomers.

These block copolymers need not be chemically crosslinked to exhibit elasticity of the same degree as that of vulcanized rubber, and like conventional thermoplastics, the block copolymers become plastic on application of heat and can be easily shaped or otherwise processed. Because of these advantages, the aforementioned block copolymers are used to make various shaped articles which are conventionally formed from vulcanized rubber, such as footwears, sheets, belts, tires, and toys. Other use of these block copolymers are as raw materials for making adhesives or as modifiers for incorporation in plastics.

As a representative method for producing thermoplastic elastomers made of these block copolymers, there is a known method in which a monovinyl aromatic hydrocarbon is polymerized in a polymerization medium in the presence of an organomonolithium compound as a polymerization initiator; a conjugated diolefin is then added to perform block copolymerization; and a monovinyl aromatic hydrocarbon is further added to perform polymerization, or in the alternative, a dialkenyl aromatic hydrocarbon or a dihalogenated hydrocarbon is added to perform coupling, to thereby obtain a block copolymer of the A-B-A' type, wherein A is a monovinyl aromatic hydrocarbon polymer block, B is a conjugated diolefin polymer block, and A' is either the same as A or a polymer block derived from the dialkenyl aromatic hydrocarbon or dihalogenated hydrocarbon, as described, for example, in Japanese Patent Publication Nos. 23798/1965, 24914/1965, and 24915/1965.

In order to polymerize the monovinyl aromatic hydrocarbon in the first step, the aforementioned known method employs as the polymerization medium a solvent capable of dissolving the resulting monovinyl aromatic hydrocarbon polymer, such as aromatic hydrocarbon solvents (e.g., benzene and toluene), alicyclic hydrocarbon solvents (e.g., cyclohexane and methylcyclohexane), and ether solvents (e.g., tetrahydrofuran). These solvents, however, have high toxicity or boil at high temperatures and present various problems when they are used on an industrial scale. In addition, the either solvents will increase the proportion of the 1,2-bond or 3,4-bond on the block B of the resulting block copolymer, with the result that the product tends to reduce elasticity, especially elastic recovery at low temperatures.

Japanese Patent Publication No. 19286/1961 describes a method in which a conjugated diolefin is polymerized using an organodilithium compound (e.g., dilithiostilbene) as a polymerization initiator, and the resulting active diolefin polymer is copolymerized with a monovinyl aromatic hydrocarbon. Further, Japanese Patent Publication No. 3990/1971 describes a method in which polymerization of a conjugated diolefin and a monovinyl aromatic hydrocarbon is carried out using as a polymerization initiator an organomonolithium compound solution of a chained aliphatic hydrocarbon in which a block or graft copolymer composed of a conjugated diolefin polymer block and a monovinyl aromatic hydrocarbon polymer block or a mixture of these block and graft copolymers is dissolved or stably dispersed.

The former method is disadvantageous in that it is difficult to obtain the organodilithium compound on an industrial scale and that if the organodilithium compound whose purity is once reduced as a result of, for example, its recycled use is employed, the resulting thermoplastic elastomer of the A-B-A' type has insufficient physical properties, especially small mechanical strength. In addition, the synthesis of the organodilithium compound usually involves the use of an ether solvent, and this ether solvent, entering into the polymerization system, may increase the proportion of the 1,2- or 3,4-bond on the block B of the block copolymer, to thereby reduce the elasticity of the block copolymer, especially its elastic recovery at low temperatures.

The latter method requires preliminary production of the intended block or graft copolymer or mixture of block and graft copolymers, and therefore, this results in prolonged process time and reduced productivity.

As described above, the known methods for the production of the block copolymer of the A-B-A type suffer from one or more defects or limitations in their industrial operation, and because of inevitable increase in production costs or need for making special provisions to ensure hygenic conditions for the workers, a final product either has degraded quality or lacks good reproducibility of quality. These present a substantial bar against commercial use of the thermoplastic elastomer of the A-B-A type.

SUMMARY OF THE INVENTION

The present inventors therefore made various studies in order to solve the aforementioned problems of the prior art and to develop an industrially feasible process for the production of a thermoplastic elastomer of the A-B-A' type using a substantially non-toxic and easily recoverable and purifiable solvent, which is capable of yielding an end product having good physical properties with high reproducibility. As a result, the inventors have found that these objects can be attained by polymerizing specified proportions of monomers using an organomonolithium compound as a polymerization initiator in a specified polymerization medium.

An object of the present invention is to provide a process for producing a thermoplastic elastomer comprising a block copolymer of the A-B-A' type, wherein A is a monovinyl aromatic hydrocarbon polymer block, B is a conjugated diolefin polymer block, and A' is either the same as A or a polymer block derived from a dialkenyl aromatic hydrocarbon or a dihalogenated hydrocarbon, which process comprises polymerizing a monovinyl aromatic hydrocarbon in a polymerization medium in the presence of an organomonolithium compound as a polymerization initiator, adding a conjugated diolefin to perform block copolymerization, and further adding a monovinyl aromatic hydrocarbon to perform polymerization or in the alternative, adding a dialkenyl aromatic hydrocarbon or a dihalogenated hydrocarbon to perform coupling, wherein the monomer components are used in such amounts that the weight ratio of (A+A') to B ranges from 10/90 to 65/35, and a chained aliphatic hydrocarbon solvent containing from 0.0001 to 0.1 wt % of a Lewis basic compound is used as the polymerization medium.

DETAILED DESCRIPTION OF THE INVENTION

The polymerization method employed in the present invention, i.e., the production of a block copolymer of the A-B-A' type by polymerizing a monovinyl aromatic hydrocarbon in a polymerization medium, adding a conjugated diolefin to perform block copolymerization, and further adding a monovinyl aromatic hydrocarbon to perform polymerization or in the alternative, adding a dialkenyl aromatic hydrocarbon or a dihalogenated hydrocarbon to perform coupling, is basically the same as the methods described in Japanese Patent Publication Nos. 23798/1965, 24914/1965, and 24915/1965.

The most important characteristic of the present invention does reside in the use of, as the polymerization medium, a chained aliphatic hydrocarbon solvent which has not so far been practically used in the polymerization with which the present invention is concerned because it does not dissolve monovinyl aromatic hydrocarbon polymers.

This chained aliphatic hydrocarbon solvent is less toxic, boils at comparatively low temperatures, and is substantially non-hygroscopic, and hence, it can be readily recovered and purified from the polymerization system. In addition, while a solution of the block copolymer in this solvent has a comparatively low viscosity, the use of such a solvent has become possible first by incorporating therein a specified amount of a Lewis basic compound.

If, in accordance with the present invention, a monovinyl aromatic hydrocarbon is polymerized by the aforementioned conventional polymerization method using an organomonolithium compound as a polymerization initiator in a specified polymerization medium instead of the conventionally used aromatic hydrocarbon solvent, the resulting active monovinyl aromatic hydrocarbon polymer is dispersed as fine particles of uniform size in the polymerization medium, and the dispersion remains very stable for an extended period of time without causing any precipitation. In addition, the solution of the polymer has a low viscosity and can be agitated with great ease.

If only the chained aliphatic hydrocarbon solvent is used with no Lewis basic compound in the polymerization medium, the monovinyl aromatic hydrocarbon polymer will immediately precipitate and may even be deposited as clumps on the inner wall surface of a polymerization vessel, which will render subsequent block copolymerization either entirely impossible or very inefficient. As a result, not only the process of the present invention cannot be implemented on an industrial scale but also no thermoplastic elastomer having excellent physical properties can be obtained thereby.

As a consequence of polymerization in the first step, an active monovinyl hydrocarbon polymer having stable dispersibility is formed in a fine particle form. This means that the polymerization that has occurred is as smooth as polymerization that is initiated by an organomonolithium compound using as a polymerization medium an aromatic hydrocarbon solvent, an alicyclic hydrocarbon solvent, or an ether solvent, which is capable of dissolving the active monovinyl aromatic hydrocarbon polymer. Subsequently, the intended thermoplastic elastomer of the A-B-A' type can be obtained by following the conventionally known methods.

More specifically, a conjugated diolefin is added to the active monovinyl aromatic hydrocarbon polymer (A-Li) stably dispersed in a fine particle form in the polymerization medium to obtain an active block copolymer (A-BLi) stably dispersed in a slurry form in the polymerization medium; and a monovinyl aromatic hydrocarbon is further added thereto to obtain a thermoplastic elastomer of the A-B-A' type stably dispersed in a slurry form in the polymerization medium, or in the alternative, the active block copolymer (A-BLi) obtained above which is stably dispersed in a slurry form in the polymerization medium is coupled with a dialkenyl aromatic hydrocarbon or a dihalogenated hydrocarbon to obtain the intended thermoplastic elastomer of the A-B-A' type.

As already mentioned, the polymerization medium used in the present invention is a chained aliphatic hydrocarbon solvent containing a Lewis basic compound. Illustrative examples of the Lewis basic compound include clclic ethers such as tetrahydrofuran and tetrahydropyran, chained ethers such as diethyl ether, and aliphatic polyethers such as diethylene glycol dimethyl ether, with tetrahydrofuran being used most commonly. Illustrative examples of the chained aliphatic hydrocarbons are straight or branched saturated aliphatic hydrocarbons such as butane, pentane, hexane, heptane, octane, nonane, and decane. Pentane, hexane, and heptane which are liquid at room temperature and boil at comparatively low temperatures are generally used, with hexane being particularly preferred. If desired, unsaturated chained aliphatic hydrocarbons such as butene-1, pentene-1, hexene-1, heptene-1, and octene-1 that will not be polymerized themselves in the presence of an organomonolithium compound can also be employed. The aforementioned chained aliphatic hydrocarbons can be used either singly or in combination.

The chained aliphatic hydrocarbon solvent should contain from 0.0001 to 0.1 wt %, preferable from 0.0005 to 0.01 wt %, of the Lewis basic compound. It the content of the Lewis basic compound is outside the above-specified range, the active monovinyl aromatic hydrocarbon polymer (A-Li) will not be stably dispersed in a fine particle form in the chained aliphatic hydrocarbon solvent, and none of the characteristic features of the present invention can be attained.

In the present invention, an organomonolithium compound is used as the polymerization initiator. This compound is more advantageous than an organodilithium compound because it enables the production of a block copolymer of the A-B-A' type with superior physical properties with good reproducibility.

Examples of the organomonolithium compound which can be employed in the present invention include methyl lithium, ethyl lithium, propyl lithium, butyl lithium, amyl lithium, hexyl lithium, α-ethyl-hexyl lithium, hexadecyl lithium, cyclohexyl lithium, allyl lithium, methallyl lithium, phenyl lithium, tolyl lithium, ethylbenzene lithium, xylyl lithium, and α-naphthyl lithium. Among these compounds, n-butyl lithium, sec-butyl lithium, tert-butyl lithium, and cyclohexyl lithium are preferably used because they are easily available, have high solubility in the chained aliphatic hydrocarbon solvent, and are well adapted to industrial use. Needless to say, these organomonolithium compounds can be used either singly or in admixture.

Examples of the monovinyl aromatic hydrocarbon used as the starting monomer in the present invention include styrene, p-methylstyrene, m-methylstyrene, o-methylstyrene, p-ethylstyrene, m-ethylstyrene, o-ethylstyrene, α-vinylnaphthalene, and β-vinylnaphthalene, with styrene being most commonly used. These monovinyl aromatic hydrocarbon monomers can be used either singly or in admixture.

The conjugated diolefin used as a comonomer is a compound having one conjugated double bond and generally having from 4 to 6 carbon atoms. Examples are 1,3-butadiene, isoprene, 2,3-dimethyl-1,3-butadiene, and 1,3-pentadiene (piperylene), with 1,3-butadiene and isoprene being used most commonly.

Examples of the dialkenyl aromatic hydrocarbon used in the coupling reaction include divinylbenzene, divinyltoluene, divinylxylene, divinylethylbenzene, divinylbiphenyl, diisobutenylbenzene, diisopropenylbiphenyl, and divinylnaphathalene, and examples of the dihalogenated hydrocarbon include dibromobutane, dibromoethane, dibromomethane, and dibromopentane.

In producing the thermoplastic elastomer comprising the block copolymer of the A-B-A' type in accordance with the present invention, the monomers described above are employed in such proportions that the weight ratio of (A+A') to B in the final block copolymer of the A-B-A' type ranges from 10/90 to 65/35, preferably from 10/90 to 50/50, more preferably from 10/90 to 30/70.

If the weight proportion of (A +A') is less than 10%, the resulting thermoplastic elastomer will have a tensile strength so small that it is not satisfactory for practical uses. On the other hand, if the weight proportion of (A +A') exceeds 65%, the elastomer will have an elongation too small to undesirably cause a reduction in elastic recovery.

From the viewpoint of attaining a balanced molecular structure and ensuring high copolymer performance, the weight ratio of A to A' in the block copolymer of the A-B-A' type generally ranges from 1/9 to 9/1, preferably from 3/7 to 7/3.

The block copolymer of the A-B-A' type preferably has a molecular weight of from 5,000 to 1,000,000, more preferably from 30,000 to 500,000. If the molecular weight is less than 5,000, the block copolymer will not have a sufficient tensile strength for use as an elastomer, whereas if it exceeds 1,000,000, the block copolymer will not have adequate workability.

In accordance with the process of the present invention, since the block copolymer of the A-B-A' type is formed in a slurry form in the polymerization medium, the thermoplastic elastomer comprising the desired block copolymer of the A-B-A' type can be produced by volatilizing off the polymerization medium from the slurry by usual methods.

In summary, the process of the present invention uses an organomonolithium compound as a polymerization initiator and performs polymerization in a polymerization medium composed of a chained aliphatic hydrocarbon solvent containing a specified amount of a Lewis basic compound, whereby a thermoplastic elastomer comprising a block copolymer of the A-B-A' type can be readily produced in an economically advantageous manner.

The thermoplastic elastomer produced by the process of the present invention will find utility in a broad range of applications including plastic blends, raw materials for adhesives, and conventional rubber articles such as footwears, electrical wires, tires, and toys.

The following examples are provided for the purpose of further illustrating the present invention but are by no means intended as limiting.

EXAMPLE 1

A 2-liter glass-made autoclave purged with a nitrogen gas was charged with a 15 wt % solution of n-hexane containing 13.5 g of styrene and 0.002 part by weight, per 100 parts by weight of n-hexane, of tetrahydrofuran. After adding thereto 1.9 mmols of n-butyl lithium, the temperature of the mixture was elevated from 40° C. to 75° C. over 30 minutes, and polymerization was subsequently conducted at 75° C. for 30 minutes.

The resulting active polystyrene was found to be uniformly dispersed in a fine particle form in n-hexane quite stably, without being deposited on the inner wall surface or the bottom of the polymerization vessel.

To the dispersion of the active polystyrene, 166 g of 1,3-butadiene was added, and polymerization was conducted at 75° C. for 2 hours. The resulting active styrene-butadiene block copolymer was found to be uniformly dispersed in a slurry form in n-hexane quite stably.

Finally, 13.5 g of styrene was added thereto, and polymerization was conducted at 75° C. for 1 hour. The resulting active styrene-butadiene-styrene block copolymer was found to be uniformly dispersed in a slurry state quite stably.

To the resulting block copolymer slurry, 10 ml of methanol as a short-stop and then 0.48 g of Sumilizer BHT ® (a product of Sumitomo Chemical Co., Ltd.) as a stabilizer were added. The n-hexane was volatilized off by vacuum drying to obtain 193 g of a thermoplastic elastomer of the A-B-A' type.

EXAMPLE 2

A 2-liter glass-made autoclave purged with a nitrogen gas was charged with a 15 wt % solution of n-hexane containing 22.5 g of styrene and 0.002 part by weight, per 100 parts by weight of n-hexane, of tetrahydrofuran. After adding thereto 2.1 mmols of n-butyl lithium, the temperature of the mixture was elevated from 40° C. to 75° C. over 30 minutes, and polymerization was subsequently conducted at 75° C. for 30 minutes. The resulting active polystyrene was found to be uniformly dispersed in a fine particle form in n-hexane quite stably, without being deposited on the inner wall surface or the bottom of the polymerization vessel.

To the dispersion of the active polystyrene, 170 g of isoprene was added, and polymerization was conducted at 75° C. for 2 hours. The resulting active styrene-isoprene block copolymer was found to be uniformly dispersed in a slurry form in n-hexane quite stably.

Finally, 22.5 g of styrene was added thereto, and polymerization was conducted at 75° C. for 1 hour. The resulting active styrene-isoprene-styrene block copolymer was found to be uniformly dispersed in a slurry form quite stably.

To the resulting block copolymer slurry, 10 ml of methanol as a short-stop and then 0.53 g of Sumilizer BHT ® as a stabilizer were added. The n-hexane was volatilized off by vacuum drying to obtain 215 g of a thermoplastic elastomer of the A-B-A' type.

COMPARATIVE EXAMPLE 1

A 2-liter glass-made autoclave purged with a nitrogen gas was charged with a 15 wt % solution of n-hexane containing 22.5 g of styrene. After adding thereto 2.1 mmols of n-butyl lithium, the temperature of the mixture was elevated from 40° C. to 75° C. over 30 minutes, and polymerization was subsequently conducted at 75° C. for 30 minutes. The resulting active polystyrene was initially formed in a fine particle form, but in spite of agitation, the polymer was soon deposited as a layer on the inner wall surface and the bottom of the polymerization vessel.

170 g of isoprene was then added thereto, and polymerization was conducted at 75° C. for 2 hours. The isoprene reacted with almost all the active polystyrene, and the resulting active styrene-isoprene block copolymer was found to be uniformly dispersed in a slurry form in n-hexane stably. However, part of the active polystyrene did not react with the isoprene and was still deposited as a layer on the inner wall surface and the bottom of the polymerization vessel.

Finally, 22.5 g of styrene was added thereto, and polymerization was conducted at 75° C. for 1 hour. The resulting active styrene-isoprene-styrene block copolymer was found to be uniformly dispersed in a slurry form stably, but almost all of the active polystyrene did not react with the styrene and was still deposited as a layer on the inner wall surface and the bottom of the polymerization vessel.

COMPARATIVE EXAMPLE 2

A 2-liter glass-made autoclave purged with a nitrogen gas was charged with a 15 wt % solution of n-hexane containing 22.5 g of styrene and 0.44 part by weight, per 100 parts by weight of n-hexane, of tetrahydrofuran. After adding 2.1 mmols of n-butyl lithium, the temperature of the mixture was elevated from 40° C. to 75° C. over 30 minutes, and polymerization was subsequently conducted at 75° C. for 30 minutes. The resulting active polystyrene was initially formed in a fine particle form, but in spite of agitation, the polymer was soon deposited as a layer on the inner wall surface and bottom of the polymerization vessel.

170 g of the isoprene was then added thereto, and polymerization was conducted at 75° C. for 2 hours. The isoprene reacted with almost all of the active polystyrene, and the resulting active styrene-isoprene block copolymer was found to be uniformly dispersed in a slurry form in n-hexane stably. However, part of the active polystyrene did not react with the isoprene and was still deposited as a layer on the inner wall surface and the bottom of the polymerization vessel.

Finally, 22.5 g of styrene was added thereto. Eight minutes later, the viscosity of the solution in the system rose sharply, and considerable difficulty was encountered in agitating the solution. Therefore, polymerization was stopped at this stage.

EXAMPLE 3

A 2-liter glass-made autoclave purged with a nitrogen gas was charged with a 10 wt % solution of n-hexane containing 23 g of styrene and 0.002 part by weight, per 100 parts by weight of n-hexane, of tertrahydrofuran. After adding thereto 2.1 mmols of n-butyl lithium, the temperature of the mixture was elevated from 40° C. to 75° C. over 30 minutes, and polymerization was subsequently conducted at 75° C. for 30 minutes. The resulting active polystyrene was found to be uniformly dispersed in a fine particle form in n-hexane quite stably, without being deposited on the inner wall surface or the bottom of the polymerization vessel.

To the dispersion of the active polystyrene, 87 g of isoprene was added, and polymerization was conducted at 75° C. for 2 hours. The resulting active styrene-isoprene block copolymer was found to be uniformly dispersed in a slurry form in n-hexane quite stably.

Finally, 4.2 mmols of divinylbenzene was added as a coupling agent, and reaction was conducted at 75° C. for 30 minutes. The resulting active styrene-isoprenestyrene block copolymer was found to be uniformly dispersed in a slurry form quite stably.

To the resulting block copolymer slurry, 10 ml of methanol as a short-stop, and then 0.48 g of Sumilizer BHT ® as a stabilizer were added. The n-hexane was volatilized off by vacuum drying to obtain 110 g of a thermoplastic elastomer of the A-B-A' type.

EXAMPLE 4

A 2-liter glass-made autoclave purged with a nitrogen gas was charged with a 10 wt % solution of n-hexane containing 23 g of styrene and 0.002 part by weight, per 100 parts by weight of n-hexane, of tetrahydrofuran. After adding thereto 1.4 mmols of n-butyl lithium, the temperature of the mixture was elevated from 40° C. to 75° C. over 30 minutes, and polymerization was conducted subsequently at 75° C. for 30 minutes. The resulting active polystyrene was found to be uniformly dispersed in a fine particle form in n-hexane quite stably, without being deposited on the inner wall surface or the bottom of the polymerization vessel.

To the dispersion of the active polystyrene 87 g of isoprene was added, and polymerization was conducted at 75° C. for 2 hours. The resulting active styrene-isoprene block copolymer was found to be uniformly dispersed in a slurry form in n-hexane quite stably.

Finally, 0.7 mmol of dibromoethane was added as a coupling agent, and reaction was conducted at 75° C. for 30 minutes. The resulting active styrene-isoprene-styrene block copolymer was found to be uniformly dispersed in a slurry form quite stably.

To the resulting block copolymer slurry, 10 ml of methanol as a short-stop and then 0.48 g of Sumilizer BHT ® as a stabilizer were added. The n-hexane was volatilized off by vacuum drying to obtain 110 g of a thermoplatic elastomer of the A-B-A' type.

While the invention has been described in detail and with reference to specific embodiments thereof, it will be apparent to one skilled in the art that various changes and modifications can be made therein without departing from the spirit and scope thereof.

What is claimed is:

1. A process for producing a thermoplastic elastomer comprising a tri-block copolymer A-B-A' or A-B-A, wherein A and A' are each a monovinyl aromatic hydrocarbon polymer block, and B is a conjugated diolefin homopolymer block, which process comprises polymerizing a monovinyl aromatic hydrocarbon in a polymerization medium in the presence of an organomonolithium compound as a polymerization initiator to produce an active polymer A-Li adding a conjugated diolefin to perform block copolymerization producing an active block copolymer -A-B-Li and further adding a monovinyl aromatic hydrocarbon to perform polymerization or in the alternative, adding a dialkenyl aromatic hydrocarbon or a dihalogenated hydrocarbon to perform coupling of A-B-L, wherein the monomer components are used in such amounts that the weight ratio of (A +A') to B ranges from 10/90 to 65/35, and wherein said polymerization medium consist essentially of normal hexane containing from 0.0001 to 0.1 wt % of tetrahydrofuran.

2. A process according to claim 1, wherein the weight ration of (A +A') to B ranges from 10/90 to 50/50, and the content of tetrahydrofuran in the normal hexane ranges from 0.005 to 0.01 wt %.

3. A process according to claim 2, wherein the weight ratio of (A+A') to B ranges from 10/90 to 30/70.

4. A process according to claim 1, wherein the organomonolithium compound is n-butyl lithium, sec-butyl lithium, tert-butyl lithium, or cyclohexyl lithium.

5. A process according to claim 1, wherein the monovinyl aromatic hydrocarbon is styrene.

6. A process according to claim 1, wherein the conjugated diolefin is 1,3-butadiene or isoprene.

7. A process according to claim 1, wherein the dialkenyl aromatic hydrocarbon is divinylbenzene.

8. A process according to claim 1, wherein the dihalogenated hydrocarbon is dibromomethane.

* * * * *